United States Patent Office 3,480,609
Patented Nov. 25, 1969

3,480,609
HIGH-MOLECULAR WEIGHT, ACETOXY-SUBSTITUTED SATURATED POLYBUTADIENE
Duncan W. Frew, Jr., Pleasant Hill, Calif., assignor to Shell Oil Company, New York, N.Y., a corporation of Delaware
No Drawing. Filed Apr. 12, 1968, Ser. No. 721,116
Int. Cl. C08f 29/08; C09j 3/14
U.S. Cl. 260—94.7          1 Claim

ABSTRACT OF THE DISCLOSURE

Novel compositions comprising a petroleum wax and from about 5 to about 50% of a novel polymer having an intrinsic viscosity of at least 1.2 dl./g., said polymer produced by (a) epoxidizing between about 10% and 25% of the ethylenic unsaturation of a polybutadiene having up to about 10% 1,2-units, (b) selectively hydrogenating the partially epoxidized polymer of (a) until the remaining ethylenic unsaturation is removed, (c) converting the epoxide groups to hydroxyl groups by treating the polymer of (b) with a reducing agent, and (d) acetylating the hydroxyl groups of the polymer of (c). The wax-polymer compositions are useful as laminating waxes and coatings for cartons, corrugated board and the like.

CROSS-REFERENCES TO RELATED APPLICATIONS

This application is a continuation-in-part of copending application of D. W. Frew, Jr., U.S. Ser. No. 573,850, filed Aug. 22, 1966, now U.S. Patent 3,397,164.

BACKGROUND OF THE INVENTION

Copolymers of ethylene and vinyl acetate have been known for some time. These polymers have found use in many applications such as in the preparation of adhesives, films, molded articles and the like. However, due to their physical characteristics the copolymers have been found particularly useful in blending with waxes to produce coating compositions which are especially suited for coating and laminating compositions for paper in preparing cartons, boxes, containers, etc. These copolymers are known to impart toughness and strength to a variety of waxes, rosins, and similar materials.

The ethylene-vinyl acetate copolymers known heretofore are conventionally prepared by copolymerizing the monomeric components in the presence of free radical initiating catalysts. However, such a technique has a number of disadvantages. A major disadvantage is the necessity of utilizing high pressures of up to 2500 atmospheres and even higher during the polymerization, the use of which is time-consuming and inconvenient. However, more important than disadvantages of utilizing high-pressure techniques in preparing the copolymers is the fact that the copolymers themselves are of a rather limited molecular weight. Although such copolymers are often referred to as being of "high molecular weight," it is found that such products generally have a molecular weight of less than about 100,000 as characterized by intrinsic viscosity measurements. Further, attempts to prepare higher molecular weight copolymers heretofore have proven unsuccessful.

SUMMARY OF THE INVENTION

It has now been found that novel high-molecular-weight polymers which are acetoxy-substituted saturated polybutadienes can be produced by a method described hereinbelow.

The polymers of the invention are of substantially linear carbon chain structure having one randomly located acetoxy substituent on the average for every 2 to 11 randomly located recurring polytetramethylene and poly (1,2-butylene) units and the poly(1,2-butylene) units present are at least 4% but no more than about 10% of the total units, i.e., of the sum of the polytetramethylene and poly 1,2-butylene) units. The polymers of this in-invention are characterized by having intrinsic viscosities of at least 1.2 dl./g. and preferably from about 1.5 dl./g. to about 5.0 dl./g. or higher. These intrinsic viscosities correspond to molecular weights of from about 150,000 to about 1,000,000. In this manner the acetoxy-containing polymers described herein are distinguished from those prepared heretofore which have intrinsic viscosities of less than about 1. dl./g. The polymers of this invention have outstanding properties which make them superior to the lower molecular weight, acetoxy-containing polymers.

The high-molecular-weight polymers of the invention are prepared by (1) epoxidizng a substantially linear polybutadiene, (2) selectively hydrogenating the remaining ethylenic unsaturation of the epoxidized polymer molecule, (3) reductively cleaving the epoxide ring to produce a corresponding hydroxy-substituted saturated polybutadiene, and (4) acetylating the hydroxyl groups of the molecule to give an acetoxy-substituted saturated polybutadiene. This method of preparing the polymers allows for a polymer of predetermined molecular weight whose degree of branching and acetoxy content may be calculated and specifically selected, depending on the molecular weight and type of polybutadiene started with and the extent of epoxidation carried out.

DESCRIPTION OF PREFERRED EMBODIMENTS

The polybutadiene starting material is one having an average molecular weight of at least 150,000 and preferably between about 150,000 and 500,000. The molecular structures of polybutadiene are:

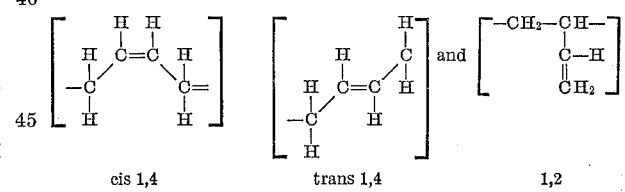

It is preferred to use a polybutadiene having little 1,2-unit content in order to avoid branching of the copolymer molecule. Thus, it is preferred to use a polybutadiene high in cis 1,4 and/or trans 1,4-units. Preferred polybutadiene will contain at least 4% but no more than about 10% 1,2-units. Such polymers are prepared by a number of known methods. These may be prepared by polymerizing butadiene in the presence of a catalyst system comprising a reaction product of (1) an organometallic compound wherein the metal is selected from Groups I–III of the Periodic Table and (2) a metal salt wherein the metal is selected from Group IV–VI and VIII of the Periodic Table and manganese. Preferred of the organo-metallic compounds are the aluminum trialkyls, magnesium alkyls, zinc alkyls or alkyl aluminum halides. The Group VIII metal salts are also preferred and especially the cobalt and nickel chlorides, bromides, nitrates and carboxylates such as the diisopropylsalicylates. The halides of titanium, zirconium and vanadium are also very useful in preparing high cis 1,4 polymers, with the trichlorides and tribromides being preferred. The method of preparing these catalyst components by aging in a hydrocarbon diluent are well known to those skilled in the art.

Polymerization of the butadiene may take place in liquid phase at temperatures between about −40° C. to about 150° C. at pressures below about 500 p.s.i. in the presence of the polymerization catalyst and preferably in an aromatic hydrocarbon diluent such as benzene, toluene, etc. By using the liquid fraction of the aged catalyst mixtures set forth above, rapid polymerization to produce a high cis 1,4 polymer which is substantially free of catalyst residues is provided.

Under polymerization conditions and using the catalysts as set forth above, high yields of high-molecular-weight polybutadiene having a microstructure of up to about 10%, 1,2-units with a cis 1,4 structure of between about 85 and 99% with the remainder being trans 1,4 are obtained.

Another suitable catalyst system is a lithium-based catalyst including metallic lithium or an organolithium compound. Suitable organolithium compounds are the lithium hydrocarbons such as for example methyllithium, butyllithium, amyllithium, allyllithium, methallyllithium, etc., as well as the aryl, alkaryl and aralkyl-lithium compounds such as phenyllithium, tolyllithium and the like and mixtures thereof. Also included are hydrocarbon polylithium compounds such as alkylene and aromatic polylithium compounds. These lithium-based catalysts result in polybutadienes having a microstructure wherein the 1,2 content is about 10% or less, with a more even distribution of cis and trans 1,4-units.

The recovered polybutadienes are then epoxidized. Any suitable epoxidation method may be used but care must be taken to avoid ring opening during the reaction. Thus, reasonably mild conditions should be used. Suitable epoxidizing agents include, for example, peracetic acid, perbenzoic acid, monoperphthalic acids, etc. The amount of epoxidizing agent used may be varied, depending on the degree of epoxidation desired. For each ethylenic group to be epoxidized, it is necessary to use at least one mole of epoxidizing agent per mole of polymer. It will be appreciated that the number of epoxy groups placed in the polymer molecule will directly determine the number of acetoxy groups present in the final polymer.

Epoxidation may be carried out in a suitable mutual solvent for reactants such as benzene, toluene, dichloromethane, ethyl actate, ethyl ether, chloroform and the like. Reaction temperatures may vary over a considerable range, depending on the epoxidizing agent selected. Generally, temperatures between about 0° and 60° C. and preferably between about 0° and 40° C. are suitable. Pressures are not critical and may be ambient. It is preferable to avoid using large concentrations of epoxidizing agent in order to prevent ring opening. It is not necessary to operate under anhydrous conditions but the amount of water present should be limited so as to avoid hydrolysis of the epoxy groups.

Since each epoxide group in the epoxidized polybutadiene will ultimately form an acetoxy group, epoxidation is carefully controlled to insure the intended epoxy groups are introduced into a polymer molecule. Full epoxidation of each ethylenic group in the polybutadiene will result in polymer having a saturated butadiene: acetoxy derived mol ratio of 1:1. However, polymers having a ratio of between about 2:1 and 11:1 and preferably between about 3.5:1 and 9.5:1 are preferred for most purposes because of desirable polymer poperties thereof. Thus, epoxidation of the polybutadiene to give an oxygen content of between about 3.0 and 7.6% by weight corresponding to epoxidation of about 10–25% of the ethylenic groups is suitable for preparing polymers having the desired ratio.

The epoxidized polybutadienes are selectively hydrogenated in a suitable solvent in which the polymers are soluble or at least swollen. Suitable solvents include sulfolane, toluene, xylene, decalin, tetrahydrofuran, etc.

The catalyst systems used in the hydrogenation reaction may be heterogeneous or homogeneous. Suitable heterogeneous catalysts include, for example, platinum, rhodium, osmium, ruthenium, iridium, palladium, rhenium, nickel, cobalt, copper, chromium, iron and compounds thereof such as oxides, sulfides, carbonyls, etc. These catalysts may be used alone or supported on a relatively inert material such as carbon, diatomaceous earth, alumina, silica, asbestos, pumice, etc. In order to achieve more efficient hydrogenation, it may be necessary to keep the heterogeneous catalysts dispersed throughout the polymer-containing solution such as by stirring the reaction mixture or agitating the reaction vessel. Amounts of catalyst between about 0.01 and 10% and preferably between about 0.1 and 5% by weight based on the polymer may be used.

Homogeneous catalysts offer the advantages of being rapidly dispersed throughout the reaction medium and of allowing for the use of milder hydrogenation conditions which in turn offers less danger of opening the epoxy rings. Such homogeneous catalysts include homogeneous rhodium halide complex catalysts having the formula $$(R_3E)_3RhX$$

wherein X is a halogen and preferably chlorine or bromine, E is phosphorous or arsenic and R is an organo group of from 1 to 20 and preferably 1 to 10 carbon atoms and having only aromatic unsaturation. Suitable R groups are for example, hydrocarbyl groups such as methyl, ethyl, propyl, isopropyl, isooctyl, decyl, cyclohexyl, cyclooctyl and substituted derivatives thereof such as bromomethyl, 3-(diethylamino)propyl, etc. R may also be aromatic hydrocarbyl groups such as phenyl, tolyl, xylyl, p-ethylphenyl, p-tert-butylphenyl, etc. and substituted derivatives thereof. The R groups may be the same or different, but those wherein they are the same are preferred. The trihydrocarbylphosphines or arsines, $R_3E$, are in actuality stabilizing ligands for the rhodium halide molecules examples of which included triethylphosphine, tributylphosphine, triphenylphosphine, tris(4-methoxyphenyl)phosphine, tris(3 - chlorophenyl)phosphine, diethylphenylphosphine, diphenylbutylphosphine, triphenylarsine, diethylphenylarsine, and the like. Triphenylphosphine is generally preferred because of its availability. Suitable methods of preparing the useful rhodium halide complex catalysts are disclosed in copending application, Ser. No. 417,482 filed Dec. 10, 1964. The amount of catalyst used is sufficient to provide from about 50 to 2000 p.p.m. and preferably from 100 to 1000 p.p.m. rhodium based on the polymer.

The hydrogenation reaction temperature may be from about room temperature, i.e., approximately 20° C., to about 200° C., with temperatures between about 40° and 130° C. being preferred. The rate of hydrogenation will depend upon the particular polymer being reduced, the solvent, temperature, catalyst, solution viscosity, pressure, etc. Although hydrogenation would proceed slowly at one atmosphere of hydrogen pressure, it is normally desirable to use a large excess of hydrogen and thus hydrogen pressures of up to 10,000 p.s.i. or higher may be used; the preferred range is between about 500 and 2000 p.s.i. The hydrogen may be bubbled through the polymer containing solution or slurry of swollen polymer or may be charged into a closed reaction vessel under pressure and then mixed with the solution by suitable means. The hydrogenation is such under the condition described herein that only the ethylenic unsaturation of the polymer is affected and the epoxy groups are not reduced. Although complete ethylenic hydrogenation is preferred, polymers having less than about 5% residual ethylenic unsaturation have suitable properties.

The reduction of the epoxy groups to form hydroxyl groups may be accomplished by any suitable means, care being taken to avoid procedures which will not cause cross-linking or reaction between the initially reduced epoxide groups with the remaining oxirane rings. One favorable method of completely reducing the rings without causing the undesirable cross-linking is by utilizing a metal hydride in the presence of a suitable solvent. Particularly preferred is the use of lithium aluminum hydride in ether, tetrahydrofuran, dioxane, etc. Lithium in alkyl amines may also be used. The reaction may take place at temperatures between about 40° and 100° C. The reducing agent residues may be separated from the polymer by using an acid. It is preferred to use mild acid conditions to avoid intramolecular etherification which leads to cross-linking.

Following the epoxy-reduction, the hydroxy-substituted saturated polybutadiene is converted to the acetoxy-substituted saturated polybutadiene by acetylation using conventional means such as esterification with acetic anhydride or acetyl chloride. It is preferred to carry out the reaction in an inert organic diluent in which the reactants are soluble such as toluene or xylene. It is also preferable to incorporate a basic material and preferably an organic base such as amines, pyridines, etc. into the reaction mixture in order to insure complete conversion. Suitable reaction conditions for the acetylation include temperatures between about 100 and 150° C.

The polymers of the invention have outstanding properties due to their high molecular weights as compared to the acetoxy-containing polymers having lower molecular weights. The polymers of the invention have high strength and toughness as well as a high degree of flexibility. They may be mixed with a variety of materials but are especially useful in wax blends to improve the properties thereof. The waxes which may be used in blending with the polymers of the invention include animal and vegetable waxes and especially preferred are the petroleum waxes such as paraffin and microcrystalline waxes. Suitable petroleum waxes are those having melting points of between about 120° and 200° F. The wax-polymer blends may be used as laminating waxes, coatings for cartons, corrugated board, etc. The polymers may also be used to prepare adhesive compositions and the like. The following examples are provided to illustrate the polymers of the invention and improvements thereof. Unless otherwise indicated parts and percents are given by weight.

Example I (a) Epoxidation.—A polybutadiene having a molecular weight of 175,000 and a microstructure of 88% cis-1,4, 6% trans-1,4 and 6% 1,2-units was epoxidized as follows:

Sixty grams of the polybutadiene was dissolved in 3 liters of benzene; 3 g. of sodium acetate (buffer) and 26 g. of 40% peracetic acid were added to the mixture. The reaction was carried out for about one hour at room temperature after which it was terminated by pouring the mixture into water. The water was then separated and the benzene solution washed twice with 100 ml. of 5% NaHCO$_3$ and finally with water. The polymer (58 g.) was recovered by precipitation in methanol and dissolved in 1500 ml. of tetrahydrofuran. Oxygen analysis of the polymer was about 3%. Infrared analysis indicated no epoxide ring opening.

(b) Hydrogenation.—One half of the solution (750 ml.) of epoxidized polymer was charged to a 1-liter autoclave with 0.3 g. of chlorotris(triphenylphosphine)rhodium (I) and 2.0 g. of triphenylphosphine. The vessel was purged with hydrogen and pressured to 500 p.s.i. The reaction temperature was maintained at 50° C. for 8 hours and 100° C. for 8 hours. The polymer was then recovered in ethanol, filtered, washed and dried. The polymer had an iodine No. of 0.8 and essentially no residual ethylenic unsaturation.

(c) Reduction.—Two liters of a solution of tetrahydrofuran were placed in a reactor equipped with a reflux condenser, magnetic stirrer and dropping funnel. Ten grams of the polymer prepared in (b) above was added and the mixture heated until the polymer was dissolved. A 10-20% excess of LiAlH$_4$ in tetrahydrofuran was added slowly to the solution over a period of 30-45 minutes. The reaction mixture was refluxed for 2½ hours. The excess LiAlH$_4$ was destroyed with a small amount of ethyl acetate and 6 N HCl. The polymer was recovered in ethanol, washed with water several times and dried.

(d) Acetylation.—Ten grams of the hydroxy-substituted saturated polybutadiene prepared above was dissolved in 1 liter of toluene. Acetic anhydride (.21 mole) and pyridine (.25 mole) were added and the reaction mixture heated to 120° C. for 24 hours. Infrared analysis showed no evidence of unreacted hydroxyl groups. The polymer was recovered in ethanol, washed in alcohol, redissolved in tetrahydrofuran, precipitated in ethanol and dried.

The polymer contained 5.3% oxygen and 9.8% acetoxy units, and possessed an intrinsic viscosity measured at 150° C. in decalin of 2.0 dl./g. corresponding to a molecular weight of about 200,000. The polymer had a tensile strength of 3860 p.s.i. and an elongation at break of 600%.

Example II

The steps in preparing an acetoxy-substituted saturated polybutadiene set forth in Example I above were repeated utilizing as a starting material a polybutadiene having a molecular weight of 390,000 and a 1,2 content of 4%. The final polymer recovered contained 6.2% oxygen and 11.14% acetoxy groups. The polymer intrinsic viscosity was measured to be 2.4 dl./g. corresponding to a molecular weight of about 460,000. The tensile strength of the polymer was found to be 6180 p.s.i. and the elongation was 450%.

Example III

A polymer was prepared according to the procedure of Example I except that the polybutadiene starting material had a molecular weight of 155,000 and a 1,2 content of 6.4%. The polymer recovered contained 5.6% oxygen and 10.3% acetoxy groups. The polymer possessed an intrinsic viscosity of 1.6 dl./g. corresponding to a molecular weight of 186,000 with a tensile strength of 5540 p.s.i. and an elongation of 575%.

Example IV

Blends of the polymers of Examples I–III with wax were prepared. The blends consisted of 30% polymer in a paraffin wax (Shell Wax 700) having the following properties:

| | |
|---|---:|
| Melting point, ° F. | 183.0 |
| Viscosity, SU 210° F. | 75.0 |
| Refractive index, 100° C. | 1.437 |
| Tensile strength, p.s.i. | 185 |
| Specific gravity, 60° F. | 0.94 |

In order to show a comparison of other lower-molecular-weight, acetoxy-containing polymers with those of the present invention, wax blends were made and their properties determined. The table below shows a comparison of the properties of the 30% polymer in wax blends. Such blends are similar to those used in coating cardboard containers and the like. The properties shown in the table reflect the performance characteristics of such a coating with tensile strength and yield indicating the toughness of the composition and the elongation indicating its flexibility.

The lower-molecular-weight, acetoxy-containing polymers used in the comparison were commercially available Elvax ethylene-vinyl acetate copolymer resins (E. I. du Pont de Nemours and Company) as follows:

| | Intrinsic viscosity, dl./g. (150° C. in decalin) | Percent acetoxy |
|---|---|---|
| (a) Elvax 260 | 0.81 | 19 |
| (b) Elvax 360 | 0.88 | 17 |
| (c) Elvax 460 | 0.90 | 12 |

TABLE

| Polymer | Yield, p.s.i.[1] | Tensile, p.s.i. | Elongation, percent | Melt [2] viscosity, poise |
|---|---|---|---|---|
| Example I | 1,210 | 1,570 | 680 | 44 |
| Example II | 1,210 | 2,070 | 840 | 107 |
| Example III | 1,130 | 1,220 | 600 | 9.6 |
| Elvax 260 | 750 | 700 | 350 | <1 |
| Elvax 360 | 920 | 950 | 540 | 1.4 |
| Elvax 460 | | 1,030 | 90 | <1 |

[1] Stress rate, 2 inches per minute.
[2] 10% polymer, 125° C.

I claim as my invention:

1. An acetoxy-substituted saturated polybutadiene having an intrinsic viscosity measured in decalin at 150° C. between 1.2 dl./g. and 5.0 dl./g. and produced by (a) epoxidizing between about 10% and 25% of the ethylenic unsaturation of a polybutadiene having an average molecular weight between 150,000 and 1,000,000 and having at least 4% but no more than about 10% 1,2-units, (b) selectively hydrogenating the polymer of (a) until the remaining ethylenic unsaturation is removed, (c) converting the epoxide groups to hydroxyl groups by treating the polymer of (b) with a reducing agent of lithium aluminum hydride in an ether or lithium in alkylamines, and (d) acetylating the hydroxyl groups of the polymer of (c) acetic anhydride or acetylchloride.

References Cited

UNITED STATES PATENTS

| 2,838,478 | 6/1958 | Hillyer et al. | 260—94.7 XR |
| 3,253,000 | 5/1966 | Kirchhof et al. | 260—94.7 XR |
| 3,312,744 | 4/1967 | Farr et al. | 260—94.7 XR |

JOSEPH L. SCHOFER, Primary Examiner

W. F. HAMROCK, Assistant Examiner

U.S. Cl. X.R.

260—28.5, 96